June 15, 1943.  A. HAUGE  2,321,675
SCREEN UNIT
Filed Feb. 8, 1941
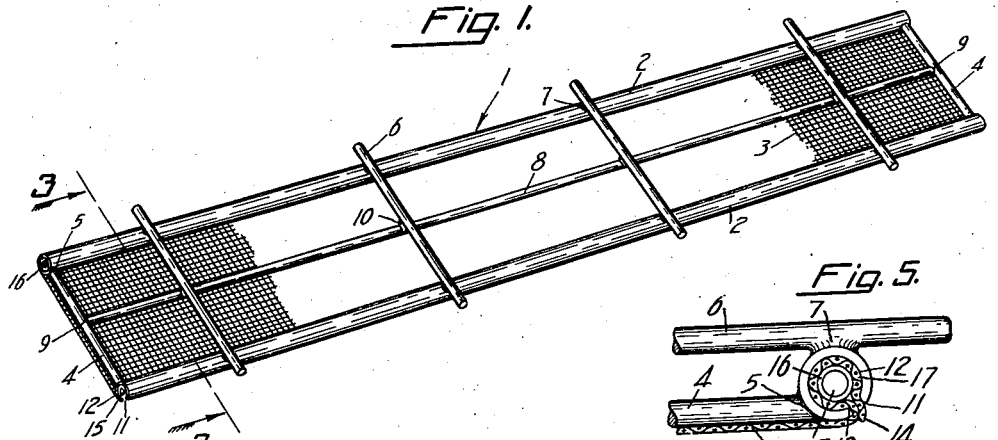
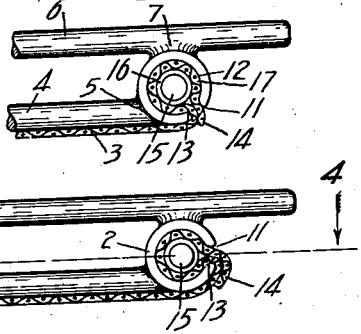
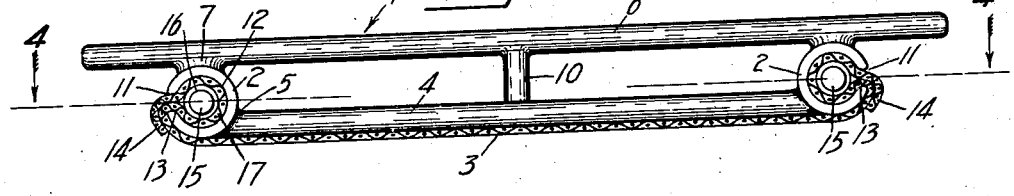
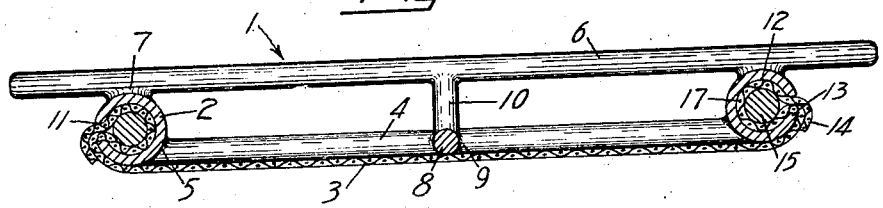
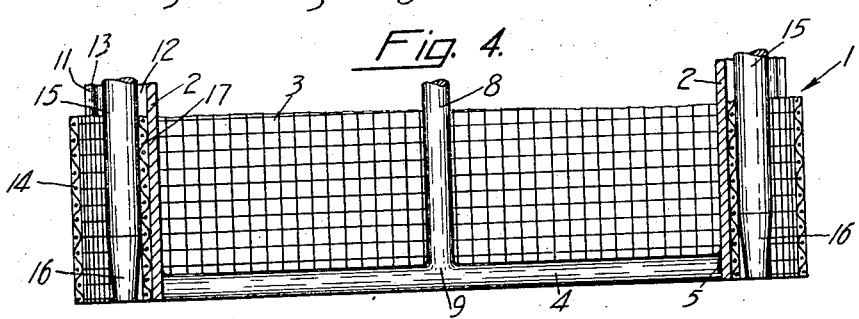
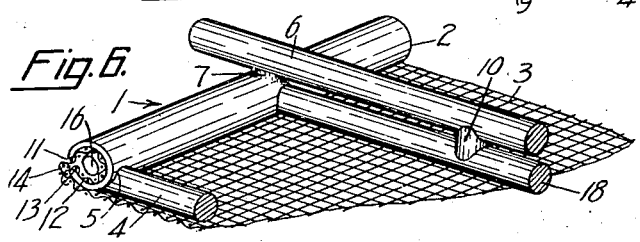
INVENTOR
Andrew Hauge
By
ATTORNEY Patented June 15, 1943

2,321,675

UNITED STATES PATENT OFFICE 2,321,675

SCREEN UNIT

Andrew Hauge, Claremont, N. H., assignor to Claremont Waste Manufacturing Company, a corporation of New Hampshire Application February 8, 1941, Serial No. 377,952

10 Claims. (Cl. 209—403)

My invention relates to screen units.

It has among its objects to provide an improved screen unit wherein the screen material is disposed and tensioned in an improved manner. A further object of my invention is to provide such a unit having an improved frame on which the screen material is stretched in an improved manner and which is of simple yet rigid construction and provides a minimum of obstruction for the material being screened. Another object is to provide improved means for connecting marginal portions of the screen material to this frame, whereby the screen is readily and securely attached thereto. Still another object of my invention is to provide such an improved unit having the above advantages and also adapted to a wide range of uses, i. e., in flock cutters or in various other relations, while also being adapted to be inexpensively produced. These and other objects and advantages of my improvements will, however, hereinafter more fully appear.

In the accompanying drawing, I have shown for purposes of illustration three embodiments which my invention may assume in practice.

In this drawing—

Figure 1 is a perspective view of a screen unit of my improved construction;

Fig. 2 is an end elevation thereof;

Fig. 3 is a section on line 3—3 of Figure 1;

Fig. 4 is a section on line 4—4 of Figure 2;

Fig. 5 is a detail end elevation of a modified construction wherein the slits are disposed at a different angle relative to the screen cloth, and Fig. 6 is a detail perspective view of a further modified construction.

Referring first to the form of my invention shown in Figures 1 to 4, I have shown therein a screen unit generally indicated at 1 and including an improved frame having parallel spaced side members 2 suitably connected to form a substantially rigid unit and having screen material 3 stretched across the under face of this frame and connected to the longitudinal members 2 in an improved manner, all as hereinafter more specifically described.

Referring more in detail to the frame of the unit 1, it will be noted that this is of an improved light yet strong skeleton construction. More particularly, the members 2 are in the form of tubular members, and are connected at their ends by transverse bottom members or rods 4 of smaller cross section, preferably suitably connected as by welding at 5, to the adjacent under portions of the members 2. Herein also the members 2 are connected by upper longer transverse members 6 spaced along the members 2, as shown in Figure 1, and of substantially the cross section of the members 4 and suitably welded to the tops of the members 2, as at 7. Herein also a longitudinally extending member 8 is provided welded at its ends at 9 to the members 4 midway between their ends and also connected to the members 6 by short vertical portions 10 welded at its opposite ends to both the member 8 and the several top members 6. Thus, a unit is provided which has a maximum effective screening area and which has the bottoms of the members 2, 4 and 8 disposed in the plane of the screen 3, and with the latter engaging the member 4 at opposite ends and the member 8 extending centrally longitudinally of the frame, while the opposite longitudinal edges of the material 3 engage the under faces of the members 2 throughout the length of the unit.

Upon this frame, the screen material 3 is stretched beneath the members 2 and the transverse connecting members 4 and the longitudinal connecting member 8, while being connected to the members 2 in an improved manner as shown in Figure 2. Here it will be observed that the members 2 are each provided with longitudinal slits 11 along their outer sides. As shown, these slits 11 are of such width as to receive two thicknesses of the screen material and these slits are also so disposed that they are parallel to the surface of the body of the screen cloth, while suitably rounded edges are provided on both walls of the slits. Within each of these slits 11 is a larger longitudinal chamber 12 provided in the hollow member 2, and within these slits 11 the marginal portions of the screen cloth 3 are disposed and connected in an improved manner. Herein it will be observed that the screen cloth passes over a rounded upstanding portion 13 on the lower edge of each slit 11 and then is looped around the inner periphery of the chamber 12, passing out of the latter through the top of the slit 11 in such manner as to provide an exposed edge 14 of the screen overlying the portion thereof entering the slit. An elongated holding member 15, herein in the form of a round rod forced longitudinally into the chamber 12 and having a tapered end 16, is also disposed centrally in each chamber 12 in such manner that the looped portion 17 of the wire cloth is thereby expanded and pressed against the inner wall of the chamber, while the screen is thus tightened and securely positioned on the frame.

As a result of this improved construction, the screen is stretched and supported on the frame in a very effective manner. Also, the construction is such as to enable the screen to be applied very readily, folded marginal portions of the screen being suitably inserted in the slits and the ends 16 of the rods 15 then being entered in the folds to effect the desired tightening and securing. A new screen may also be substituted with facility whenever desired, it only being necessary to drive out the holding members 15 in order to release the screen and permit the insertion of the marginal portions of a new screen in the chamber 12. Attention is further directed to the fact that, due to their tapered ends, the rods 15 are readily insertable inside the folded screen portions 17 in the chambers 12. These rods 15 extending throughout the entire length of the frame, the screen is also very uniformly held thereby, each marginal edge of the screen cloth 3 having to pass over the lower upstanding edge of the slit and then under and around the member 15, in such manner as thus very effectively to prevent loosening of the screen. Moreover, it will be observed that not only is the frame rigid, but that the same is of such construction as to provide a minimum of obstruction in the path of the material. Further, the use of the top members 6 and the single longitudinal member 8 makes it possible to minimize the use of cross connections obstructing longitudinal flow of the material along the inside of the screen where such movement of the material is also desired.

In Figure 5, I have shown a modified construction wherein the slit 11, instead of being disposed parallel to the surface of the screen cloth 3, is disposed at less than a right angle to the screen cloth surface. Obviously, the particular angular relation of the slit may be otherwise varied as desired in different uses of the screen unit, while continuing to obtain the advantages of my improved construction. In Figure 6, I have shown a further modified construction wherein, instead of providing the longitudinally extending member 8 and connecting the top members 6 thereto, this member 8 is omitted and additional transverse members 18, generally similar to the members 4, are provided in spaced relation along the unit, these members 18 herein being disposed directly under the members 6 and connected thereto by such vertical connections 10 as heretofore described. This construction, while not preferred, since these members 18 provide additional obstruction to longitudinal flows, may obviously be used where conditions permit.

This application is a continuation in part of my copending application Serial No. 346,187, filed July 18, 1940.

While I have in this application specifically described certain forms which may invention may assume in practice, it will be understood that these have been shown for purposes of illustration, and that the invention may be modified and embodied in other forms without departing from its spirit or the scope of the appended claims.

What I claim as new and desire to secure by Letters Patent is:

1. In a screen supporting mechanism, a frame having two rigidly connected side members forming a bottom screen cloth supporting surface, one of said members being hollow and having a longitudinal slit therein above its bottom screen cloth supporting surface and on the side thereof remote from the other member, screen cloth stretched across the bottom of said frame and secured to said other member at one edge, the other edge of said cloth adjacent said slitted member being folded and having its fold extended through said slit and forming a loop within said hollow member, and means insertable longitudinally in said hollow member for securing said other edge and laterally tensioning said cloth, the longitudinally insertable means and the cloth surrounding the same substantially filling the interior of said hollow member.

2. In a screen supporting mechanism, a screen frame including laterally spaced, tubular, longitudinally disposed side members having longitudinal slits in their remote sides and above the bottoms thereof and having at least one end open and accessible, and screen cloth stretched across said frame beneath said side members between said slits and having folded side edge portions the folds of which are extended into said slits and disposed around the inner periphery of said tubular members, and means for securing said side edges to said side members and tensioning the cloth stretched between said members including rods inserted longitudinally through the open ends of said side members and disposed within the folds of said edge portions, the rods and the cloth surrounding the same substantially filling the interior of said tubular members.

3. In a screen supporting mechanism, a frame having rigidly connected side members forming a bottom screen cloth supporting surface, each of said members being hollow and having a longitudinal slit therein above its bottom screen cloth supporting surface and on the side thereof remote from the other member, screen cloth stretched across the bottom of said frame and having folded side edge portions, the folds of which extend into said slits and form loops within said hollow members, and screen tensioning and securing rods having tapered ends and insertable in the longitudinal bores of said members and through said folds for securing and laterally tensioning said cloth by expanding said folds as said rods are inserted, the longitudinally insertable rods and the cloth surrounding the same substantially filling the interior of said hollow members.

4. In a removable screen unit, a unitary frame including longitudinally disposed spaced side members and transverse members cooperating to provide a flat laterally unobstructed screen cloth supporting surface on the bottom of said frame, screen cloth stretched across beneath said surface and having marginal portions attached to said side members above said bottom surface, and transverse frame supporting members spaced along and connected to the tops of said side members and extending laterally beyond said side members to support the frame.

5. In a screen unit, a frame including longitudinally disposed spaced side members and transverse end members connecting said side members and cooperating therewith to provide a peripheral bottom screen cloth supporting surface, a screen cloth stretched beneath said surface and having marginal portions attached to said side members above said surface, transverse members spaced along the tops of said side members in spaced relation to said cloth and fixed to said side members, and cooperating bottom screen cloth supporting surface forming means including a longitudinally extending member spaced between said side members and fixed to said transverse end members and to the bottoms of said top members.

6. In a screen supporting mechanism, a screen frame comprising longitudinally extending spaced side members having screen material connected thereto and stretched across beneath the same, transverse bracing members between said side members and spaced along the same with their bottoms in the plane of the inner surface of said screen material, and transverse connecting members connected to the tops of said side members and extending transversely across the side members of said frame and having portions at their opposite ends projecting laterally beyond said side members.

7. In a screen supporting mechanism, a screen frame comprising longitudinally extending spaced side members having screen material connected thereto and stretched across beneath the same, transverse bracing members between said side members and spaced along the same with the bottoms thereof in substantially the same plane as the inner surface of said screen material, transverse connecting members connected to the tops of said side members and having portions projecting laterally beyond the latter, and upright bracing members connecting said bracing and connecting members intermediate the ends thereof.

8. In a screen supporting mechanism, a unitary screen frame comprising longitudinally extending laterally spaced and rigidly connected side members, cooperating screen cloth supporting means carried by said frame for supporting such a cloth stretched on the bottoms of said side members and having lower screen cloth engaging means disposed in the same plane with the lower faces of said side members and including a member parallel to said side members and between the same, and a plurality of transverse members having their opposite ends fixed to and extending beyond said side members and rigidly connected intermediate their ends to said parallel member.

9. In a screen supporting mechanism, a screen frame comprising longitudinally extending laterally spaced and rigidly connected side members, cooperating screen cloth supporting means carried by said frame for supporting such a cloth stretched on the bottoms of said side members with the sides of the cloth connected to said side members and the ends of said cloth free, and having lower screen cloth engaging means disposed in the same plane with the lower faces of said side members and including a plurality of transverse members spaced from each other along said frame and rigidly connected thereto and including members located adjacent the free ends of said cloth, and a plurality of transverse members having their opposite ends extending beyond said side members and rigidly connected intermediate their ends to certain of said transverse members.

10. In a screen supporting mechanism, a screen frame comprising longitudinally extending laterally spaced and rigidly connected side members, cooperating screen cloth supporting means carried by said frame for supporting such a cloth stretched on the bottoms of said side members with the sides of the cloth connected to said side members and the ends of said cloth free, and having lower transverse screen cloth engaging means disposed in the same plane with the lower faces of said side members adjacent the free ends of said cloth, and a plurality of transverse members spaced from each other along and rigidly connected to the top of said side members and extending laterally beyond the latter.

ANDREW HAUGE.